(12) United States Patent
Wichman

(10) Patent No.: US 6,745,314 B1
(45) Date of Patent: Jun. 1, 2004

(54) CIRCULAR BUFFER CONTROL CIRCUIT AND METHOD OF OPERATION THEREOF

(75) Inventor: Shannon A. Wichman, McKinney, TX (US)

(73) Assignee: LSI Logic Corporation, Milpitas, CA (US)

( * ) Notice: Subject to any disclaimer, the term of this patent is extended or adjusted under 35 U.S.C. 154(b) by 247 days.

(21) Appl. No.: 09/994,459

(22) Filed: Nov. 26, 2001

(51) Int. Cl.[7] .............................................. G06F 12/00
(52) U.S. Cl. ...................... 711/214; 711/217; 711/219; 711/169; 712/35; 712/209
(58) Field of Search ............................... 711/151, 167, 711/140, 169, 213, 214, 217, 219, 220; 712/35, 209

(56) References Cited

U.S. PATENT DOCUMENTS

| | | | | |
|---|---|---|---|---|
| 5,333,288 A | * | 7/1994 | Kusuda | 711/214 |
| 5,896,543 A | * | 4/1999 | Garde | 712/35 |
| 5,954,811 A | * | 9/1999 | Garde | 712/35 |
| 6,363,470 B1 | * | 3/2002 | Laurenti et al. | 711/220 |
| 6,499,098 B1 | * | 12/2002 | Laurenti | 712/209 |
| 6,519,692 B1 | * | 2/2003 | Sheier et al. | 711/219 |

OTHER PUBLICATIONS

Wess et al., "Minimization of Data Address Computation Overhead in DSP Programs", © 1998, IEEE, p. 3093–3096.*

Wess et al., "Optimal DSP Memory Layout Generation as a quadratic Assignment Problem", © 1997, IEEE, p. 1712–1715.*

Wess et al., "DSP Data Memory Layouts Optimized for Intermediate Address pointer Updates", © 1998, IEEE, p. 451–454.*

* cited by examiner

Primary Examiner—Donald Sparks
Assistant Examiner—Brian R. Peugh
(74) Attorney, Agent, or Firm—Hitt Gaines & Boisbrun, P.C.

(57) ABSTRACT

A circular buffer control circuit, a method of controlling a circular buffer and a digital signal processor (DSP) incorporating the circuit or the method. In one embodiment, the circuit includes: (1) address calculation logic, having multiple datapaths, that calculates, from data regarding a buffer operation, an updated address result therefor and (2) modification order determination circuitry, coupled in parallel with the address calculation logic, that transmits a memory access request and the updated address result in an order that is based on whether the buffer operation is pre-modified or post-modified.

20 Claims, 5 Drawing Sheets

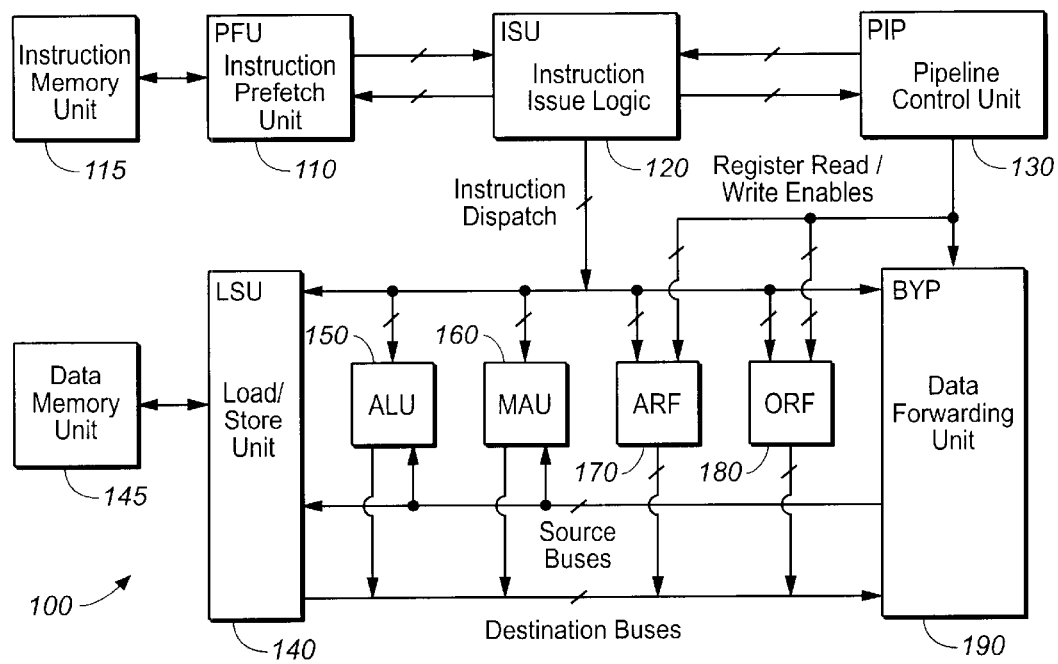
FIG._1
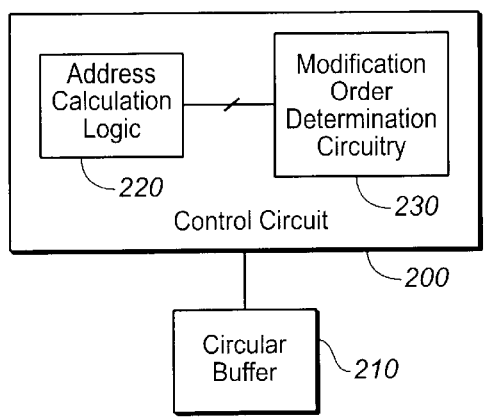
FIG._2

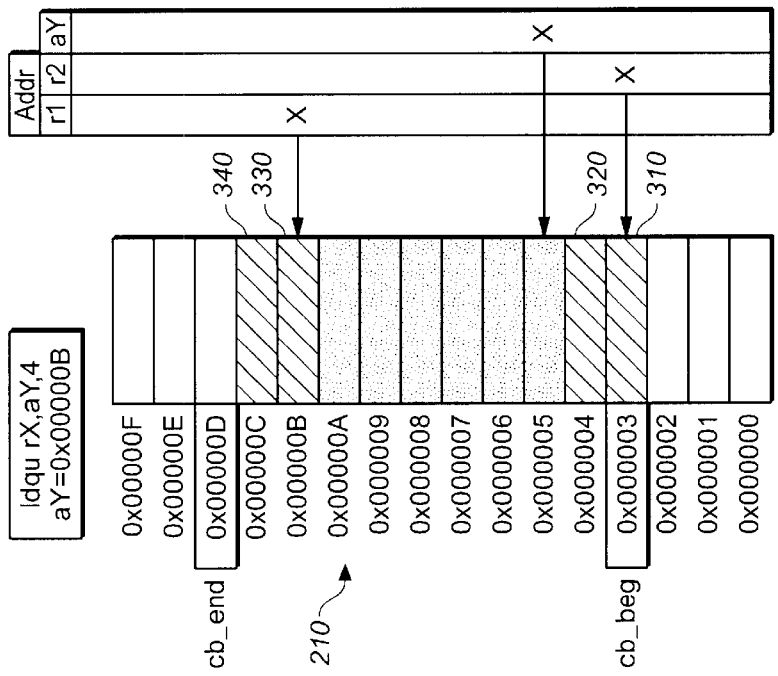
FIG._3B
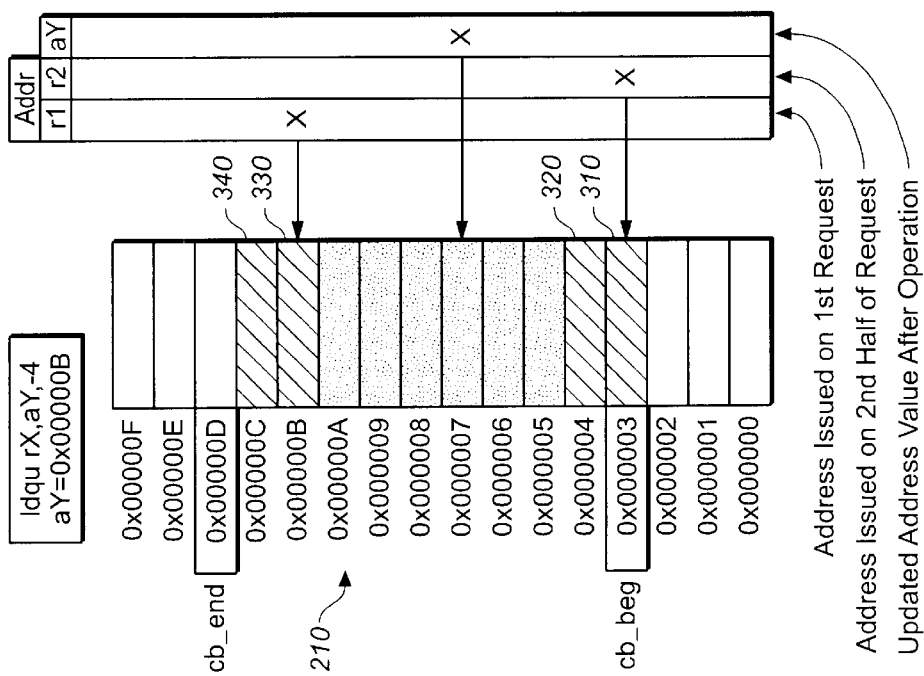
FIG._3A

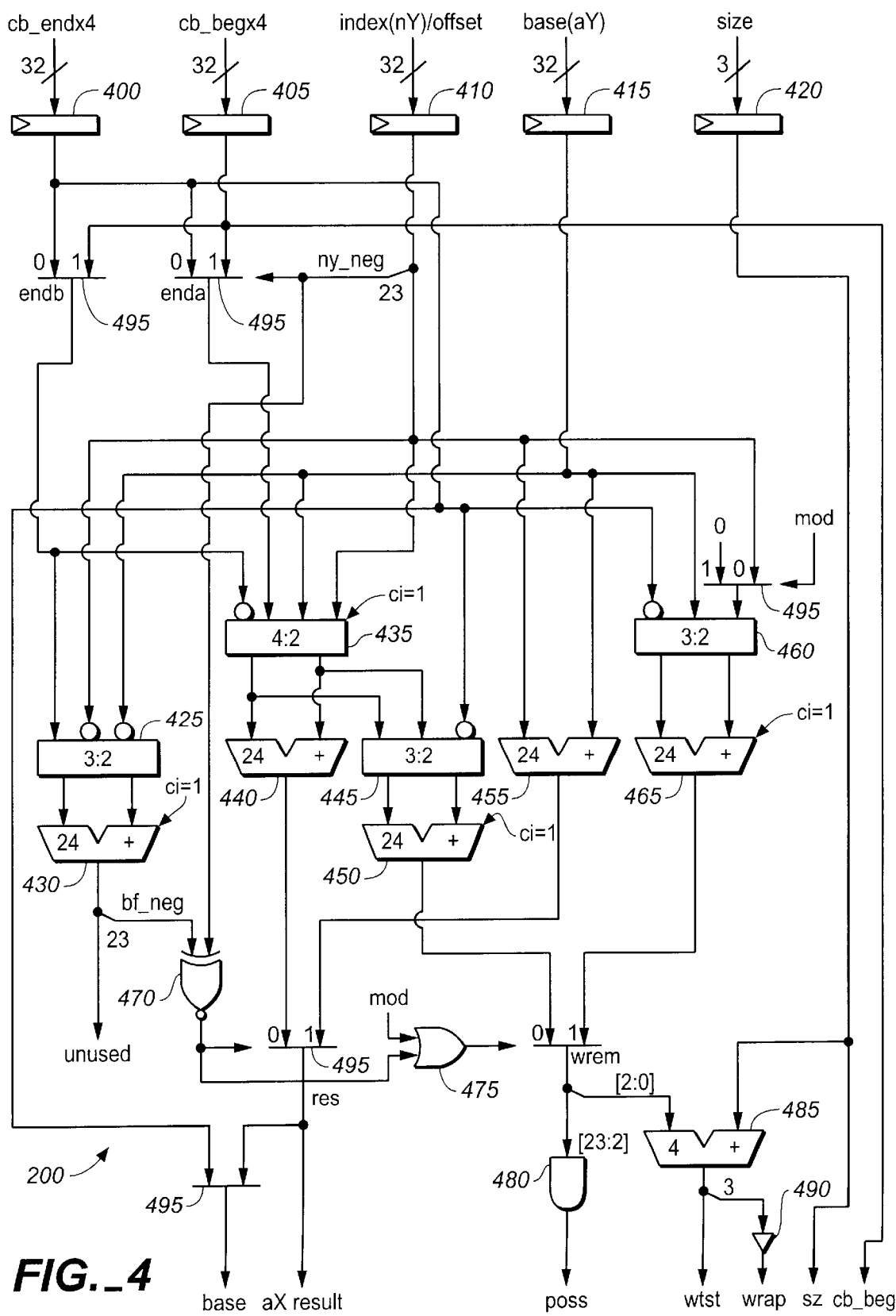
FIG._4

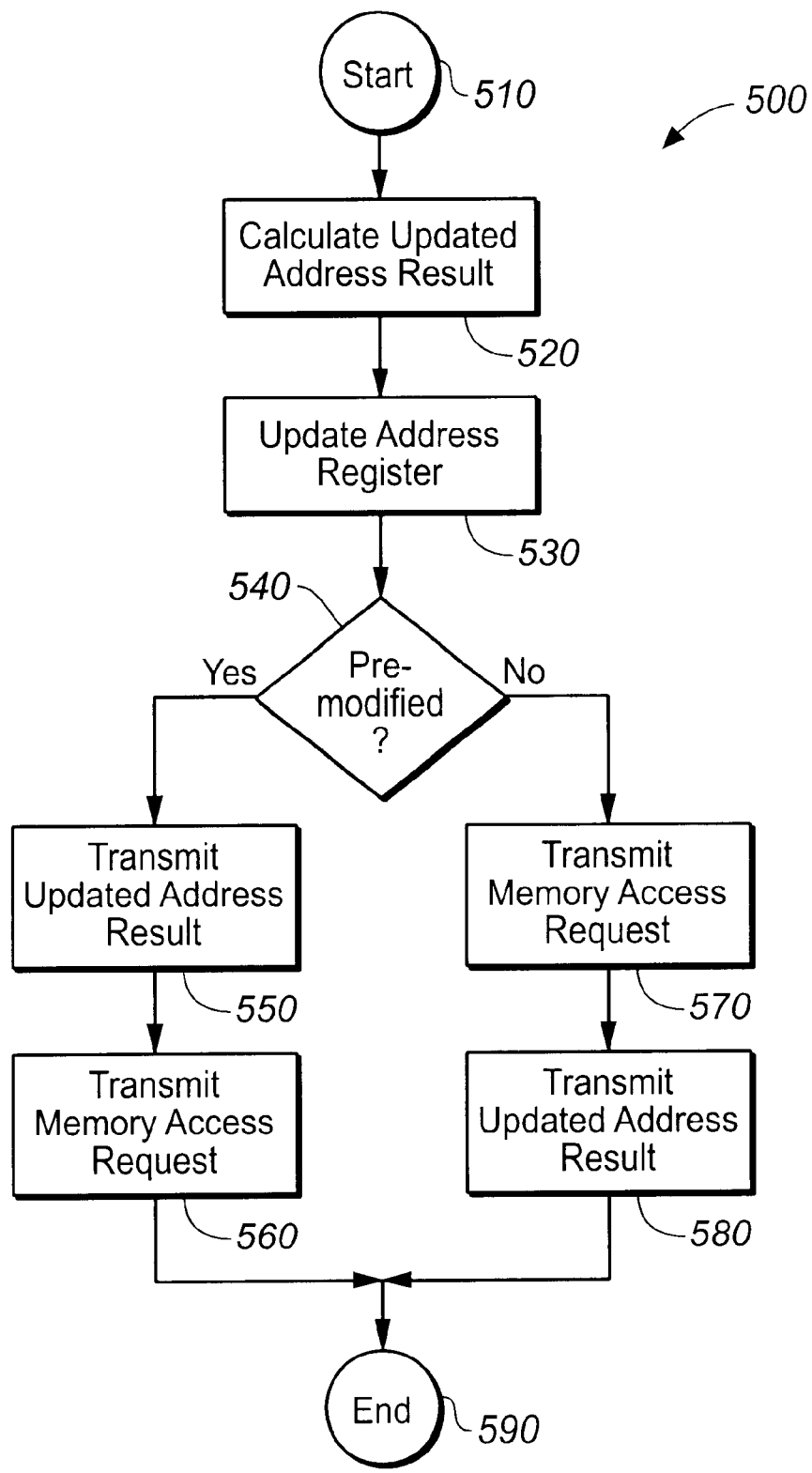
FIG._5

CIRCULAR BUFFER CONTROL CIRCUIT AND METHOD OF OPERATION THEREOF

TECHNICAL FIELD OF THE INVENTION

The present invention is directed, in general, to computer systems and, more specifically, to a circular buffer control circuit and method of operating the same.

BACKGROUND OF THE INVENTION

Over the last several years, DSPs have become an important tool, particularly in the real-time modification of signal streams. They have found use in all manner of electronic devices and will continue to grow in power and popularity.

Those skilled in the art are familiar with DSP architecture in general. Conventional DSPs employ a pipeline through which pass data representing a signal to be processed. An execution core performs various mathematical and logical operations on the data to effect changes therein. Memory is coupled to the execution core. The memory contains not only instructions concerning the way in which the data are to be modified, but also further data that may be employed in conjunction with executing the instructions.

The latest DSPs are fast and attuned to handling very large amounts of data. One function that is necessarily performed in the handling of data is memory access (i.e., storing and loading). The speed at which a DSP can store and load data is critical to the overall performance of the DSP.

Buffers are memory structures (most often a window of contiguous memory locations) that are established for the purpose of storing sequential data, usually only temporarily. Data are stored in a buffer and later loaded from the buffer. A control circuit, which may be rudimentary or complex, governs where the data are stored in and loaded from the buffer.

One particular type of buffer is germane to an understanding of the background of the present invention: a circular buffer (or "ring") buffer. While circular buffers are made up of only a finite number of memory locations, they appear to be of limitless size, because they loop back on themselves.

As data are stored in contiguous locations within the circular buffer, a physical end of the buffer (a "boundary") is eventually reached. However, instead of disallowing further storing, the buffer continues to receive data beginning at its other boundary. For example, if a circular buffer stores data to, or loads data from, sequentially increasing memory locations, it will eventually reach its upper boundary. At that point, the circular buffer "wraps around" and begins to store data to, or load data from, sequentially increasing memory locations beginning at its lower boundary. The same principle holds true for buffers that store data to, or load data from, sequentially decreasing memory locations.

Circular buffers have many applications, but their control circuits can be quite complex. Prior art control circuits for such buffers employed multiple layers of adders and complex logic to calculate addresses in the buffer to which to store or from which to load data. These prior art control circuits occupied space, and were time- and power-consuming. They were also limited in terms of the types of load and store instructions they could interpret and handle.

Accordingly, what is needed in the art is a faster, simpler circular buffer control circuit that is able to be used with a larger number of load and store operations than were prior art control circuits. What is further needed in the art is a general purpose processor or DSP that employs such circuit to advantage.

SUMMARY OF THE INVENTION

To address the above-discussed deficiencies of the prior art, the present invention provides a circular buffer control circuit, a method of controlling a circular buffer and a DSP incorporating the circuit or the method. In one embodiment, the circuit includes: (1) address calculation logic, having multiple datapaths, that calculates, from data regarding a buffer operation, an updated address result therefor and (2) modification order determination circuitry, coupled in parallel with the address calculation logic, that transmits a memory access request and the updated address result in an order that is based on whether the buffer operation is pre-modified or post-modified. A pre-modified buffer operation is one in which a buffer address is changed (incremented or decremented as appropriate) before the memory access takes place. A post-modified buffer operation is temporally reversed; the memory access takes place before the address is changed.

The present invention therefore introduces a circular buffer control circuit that is hardware-based and unrestricted in terms of the types of instructions it can accommodate.

In one embodiment of the present invention, the address calculation logic calculates the updated address result in a single clock cycle. Such speed is important in today's DSPs. However, those skilled in the pertinent art should understand that the broad scope of the present invention is not limited to single-cycle embodiments.

In one embodiment of the present invention, the address calculation logic further updates an address register in the processor. In a related embodiment, the circuit may be employed simply to generate addresses, and not to fulfill memory operations. Further, the hardware making up the circuit can be employed for other purposes when the circuit is not in use.

In one embodiment of the present invention, the address calculation logic employs an input address having base and offset components to calculate the updated address result. Those skilled in the pertinent art are familiar with base addressing schemes. Of course, the present invention can employ other types of addressing to advantage.

In one embodiment of the present invention, the address calculation logic accommodates opposing directions of circular buffer operation. Thus, the address calculation logic can work with both sequentially increasing addresses and sequentially decreasing addresses. Of course, the circuit could be limited to unidirectional operation.

In one embodiment of the present invention, the buffer operation involves varying numbers of words. In an embodiment to be illustrated and described, the buffer operation involves up to four words. Those skilled in the pertinent art will understand, however, that the principles of the present invention apply to buffer operations of any size.

In one embodiment of the present invention, the processor is a DSP. Those skilled in the pertinent art will understand, however, that the principles of the present invention can find application in processors of many types, including non-DSP, general purpose microprocessors.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 1 illustrates an exemplary DSP which may form an environment within which a control circuit for a circular buffer constructed according to the principles of the present invention can operate;

FIG. 2 illustrates a block diagram of a control circuit for a circular buffer constructed according to the principles of the present invention;

FIGS. 3A–C illustrate three buffer operation examples that the control circuit of FIG. 2 is capable of handling;

FIG. 4 illustrates a schematic of one embodiment of the control circuit of FIG. 2; and FIG. 5 illustrates a flow diagram of a method of controlling a circular buffer carried out according to the principles of the present invention.

DETAILED DESCRIPTION

Figure 3C:
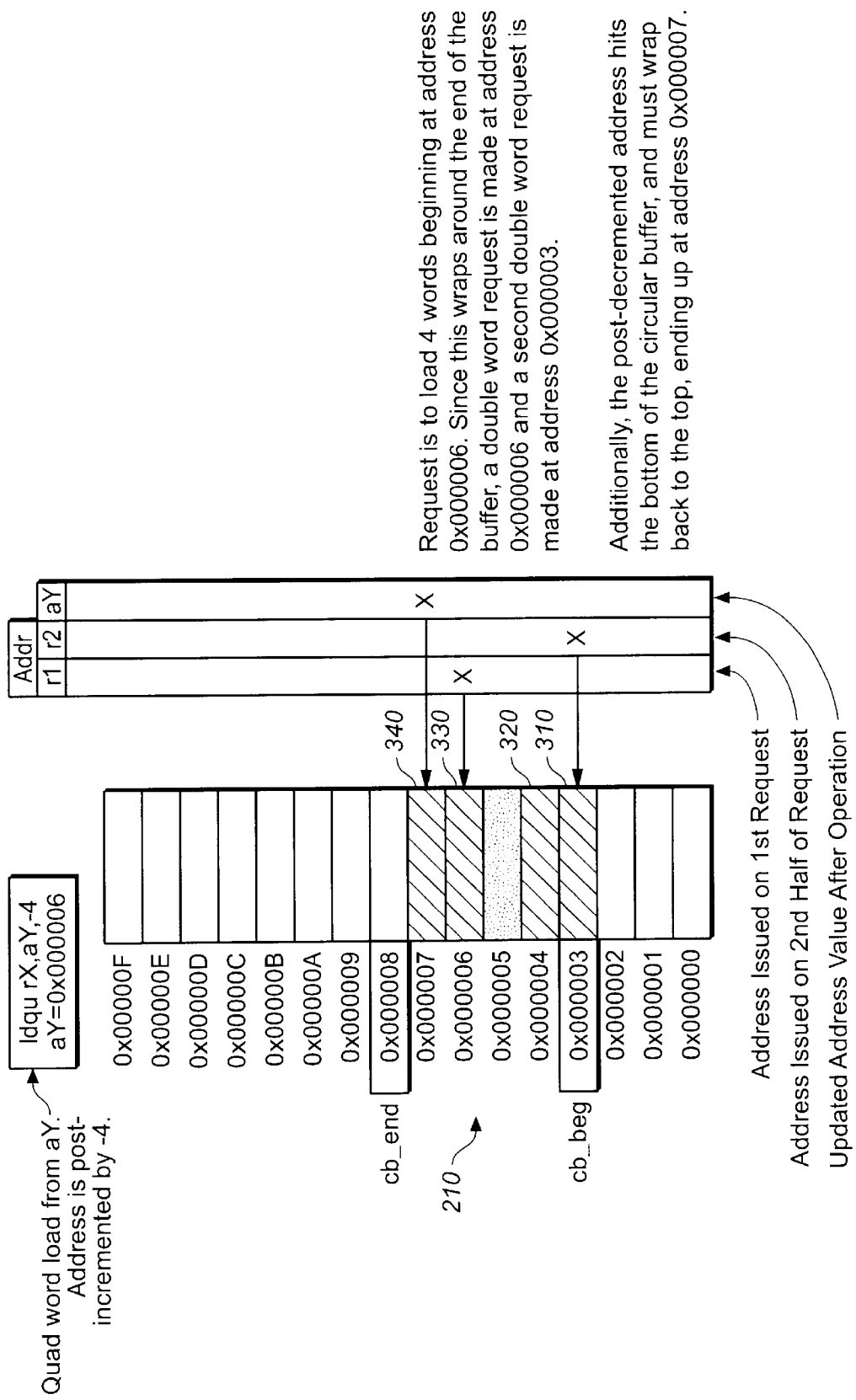

Referring initially to FIG. 1, illustrated is an exemplary DSP, generally designated 100, which may form an environment within which a control circuit for a circular buffer constructed according to the principles of the present invention can operate. Those skilled in the pertinent art should understand that the control circuit and method of the present invention may be applied to advantage in other conventional or later-discovered DSP or general-purpose, non-DSP, processor architectures.

The DSP 100 contains an instruction prefetch unit (PFU) 110. The PFU 110 is responsible for anticipating (sometimes guessing) and prefetching, from an instruction memory unit 115, the instructions that the DSP 100 will need to execute in the future. The PFU 110 allows the DSP 100 to operate faster, because fetching instructions from memory involves some delay. If the fetching can be done ahead of time and while the DSP 100 is executing other instructions, that delay does not prejudice the speed of the DSP 100. The control circuit or the method of the present invention may be located or carried out in the instruction memory unit 115.

The DSP 100 further contains instruction issue logic (ISU) 120. The ISU 120 is responsible for the general task of instruction "issuance," which involves decoding instructions, determining what processing resources of the DSP 100 are required to execute the instructions, determining to what extent the instructions depend upon one another, queuing the instructions for execution by the appropriate resources (e.g., arithmetic logic unit, multiply-accumulate unit and address and operand register files) and retiring instructions after they have been executed or are otherwise no longer of use. Accordingly, the ISU 120 cooperates with the PFU 110 to receive prefetched instructions for issuance.

In a normal operating environment, the DSP 100 processes a stream of data (such as voice, audio or video), often in real-time. The DSP 100 is adapted to receive the data stream into a pipeline (detailed in Table 1 below and comprising eight stages). The pipeline is under control of a pipeline control unit (PIP) 130. The PIP 130 is responsible for moving the data stream through the pipeline and for ensuring that the data stream is operated on properly. Accordingly, the PIP 130 coordinates with the ISU 120 to ensure that the issuance of instructions is synchronized with the operation of the pipeline, that data serving as operands for the instructions are loaded and stored in proper place and that the necessary processing resources are available when required.

TABLE 1

Pipeline Stages

| Stage | Employed to |
|---|---|
| Fetch/Decode (F/D) | fetch and decode instructions |
| Group (GR) | check grouping and dependency rules group valid instructions execute return instructions |
| Read (RD) | read operands for address generation and control register update dispatch valid instructions to all functional units execute move immediate to control register instructions |
| Address Generation (AG) | calculate addresses for all loads and stores execute bit operations on control registers |
| Memory Read 0 (M0) | send registered address and request to the memory subsystem. |
| Memory Read 1 (M1) | load data from the memory subsystem register return data in the ORF (term defined below) read operands for execution from the ORF. |
| Execute (EX) | execute remaining instructions write results to the ORF or send results to BYP (term defined below) |
| Writeback (WB) | register results in the ORF or the ARE (term defined below) |

A load/store unit (LSU) 140 is coupled to, and under the control of, the PIP 130. The LSU 140 is responsible for retrieving the data that serves as operands for the instructions from memory (a process called "loading") and saving that data back to the memory as appropriate (a process called "storing"). Accordingly, the LSU 140 is coupled to a data memory unit 145, which manages data memory to load and store data as directed by the LSU 140. The control circuit or method of the present invention may be located or carried out in the data memory unit 145.

As mentioned above, the DSP 100 contains various processing resources that can be brought to bear in the execution of instructions and the modification of the data in the data stream. An arithmetic logic unit (ALU) 150 performs general mathematical and logical operations (such as addition, subtraction, shifting, rotating and Boolean operations) and is coupled to, and under control of, both the ISU 120 and the PIP 130. A multiply-accumulate unit (MAC) and another ALU are provided in a MAC/accumulate unit (MAU) 160 to perform multiplication and division calculations and calculations that are substantially based on multiplication or division and, as the ALU 150, is coupled to, and under control of, both the ISU 120 and the PIP 130.

The DSP 100 contains very fast, but small, memory units used to hold information needed by instructions executing in the various stages of the pipeline. That memory is divided into individually designated locations called "registers." Because the various stages of the pipeline employ the registers in their instruction-processing, the registers are directly accessible by the stages. The DSP 100 specifically contains an address register file (ARF) 170 and an operand register file (ORF) 180. As the names imply, the ARF 170 holds addresses (typically corresponding to memory locations containing data used by the stages) and the ORF 180 holds operands (data that can be directly used without having to retrieve it from further memory locations).

Certain data may be required for more than one instruction. For example, the results of one calculation may be critical to a later calculation. Accordingly, a data forwarding unit (BYP) 190 ensures that results of earlier data processing in the pipeline are available for subsequent processing without unnecessary delay.

Though not illustrated in FIG. 1, the DSP 100 has an overall memory architecture that 100 is typical of conventional DSPs and microprocessors. That is, its registers are fast but small; its instruction and date caches (contained respectively in the PFU 110 and the LSU 140) are larger, but still inadequate to hold more than a handful of instructions or data; its local instruction memory and data memory 122 are larger still, but may be inadequate to hold an entire program or all of its data. An external memory (not located within the DSP 100 itself) is employed to hold any excess instructions or data.

It should be noted in this context that the illustrated DSP 100 is of a Harvard architecture. Its instruction and data memories are separate, controlled by separate controllers and separately addressed by the PFU 110 and the LSU 140, respectively. Those skilled in the pertinent art should understand, however, that the principles of the present invention are as easily applied to a von Neumann architecture (one in which instruction and data memories are merged into a single logical entity).

Turning now to FIG. 2, illustrated is a block diagram of a control circuit, generally designated 200, for a circular buffer 210 constructed according to the principles of the present invention. As previously mentioned, the circuit 200 may be located in the instruction memory unit 115 or the data memory unit 145 of FIG. 1. However, those skilled in the pertinent art should understand that the circuit 200 or the method of the present invention may be located or carried out in any functional unit of a processor or DSP as may be appropriate in a given application.

The circuit 200 is illustrated as including address calculation logic 220. The illustrated address calculation logic 210 employs input addresses having base and offset components to calculate updated address results pertaining to circular buffer 210 operations. The address calculation logic 220 has multiple datapaths that cooperate to provide a substantial degree of parallelism, which allows the address calculation logic 220 rapidly to calculate the updated address results. In the specific embodiment of FIG. 2, "rapidly" means in a single clock cycle.

In the embodiment of FIG. 2, the address calculation logic 220 further updates an address register in the DSP 100 of FIG. 1. In a related embodiment, the circuit 200 may be employed simply to generate addresses, and not to fulfill memory operations. The address calculation logic 220 preferably accommodates opposing directions of circular buffer operation. Thus, the address calculation logic 220 can work with both sequentially increasing addresses and sequentially decreasing addresses. Of course, the circuit could be limited to unidirectional operation.

The buffer operation itself can involve varying numbers of words. In the illustrated embodiment, buffer operations involve from one to four words. Of course, buffer operations may be of any size appropriate to a particular application.

The circuit 200 is further illustrated as including modification order determination circuitry 230. The modification order determination circuitry 230 is coupled in parallel with the address calculation logic 220 (again to enhance speed of operation). The modification order determination circuitry 230 transmits a memory access request and the updated address result (calculated by the address calculation logic 220) in an order that is based on whether the buffer operation is pre-modified or post-modified. The address calculation logic 220 and the modification order determination circuitry 230 are both hardware-based, which makes them fast. The circuit 200 is unrestricted in terms of the types of instructions it can accommodate.

Turning now to FIGS. 3A–C, illustrated are three buffer operation examples that the control circuit 200 of FIG. 2 is capable of handling with respect to a circular buffer 210. The circular buffers 210 of FIGS. 3A and 3B have a lower boundary cb_beg and a non-inclusive upper boundary cb_end, defining the buffer to extend from memory location 0x000003 to memory location 0x00000C.

The first example (FIG. 3A) involves a simple address wrap-around for a post-decremented load-type buffer operation. The instruction and associated operands that trigger the buffer operation is:

ldqu rX,aY,−4 wherein rX is the destination register, aY is the address register (the contents of which currently containing 0x00000B, and the "−4" indicates a decrementing load of quad-words, or four words. Further, Addr r1 is the address issued on the first buffer operation and Addr r2 is the address issued on the second half of the buffer operation. As is apparent in FIG. 3A, Addr r1 is 0x00000B, Addr r2 is 0x000003 (which is cb_beg) and aY is 0x000007. The load occurs from memory locations 310, 320, 330, 340 (cross-hatched for ease of viewing).

The second example (FIG. 3B) involves a simple address wrap-around for a post-incremented load-type buffer operation. The instruction and associated operands that trigger the buffer operation is:

ldqu rX,aY,4.

In this example, Addr r1 is 0x00000B, Addr r2 is 0x000003 (which is cb_beg), but aY is 0x000005. As before, the load occurs from the cross-hatched memory locations 310, 320, 330, 340. Comparing FIG. 3B to FIG. A, it is apparent that, while the load has occurred with respect to the same memory locations 310, 320, 330, 340, aY has been post-incremented to 0x000005, rather than post-decremented to 0x00007.

The third example (FIG. 3C) involves the same post-decremented load-type buffer operation as does FIG. 3A, but the circular buffer 210 is smaller, extending from memory location 0x000003 to memory location 0x000007. This smaller size requires the load address to wrap around from the upper boundary of the circular buffer 210 to the lower boundary thereof and the updated address to wrap around in the opposite direction. The instruction and associated operands that trigger the buffer operation is:

ldqu rX,aY,4.

In this example, Addr r1 is 0x000006, Addr r2 is 0x000003 (which is cb_beg), but aY is 0x000007. The load occurs from the cross-hatched memory locations 310, 320, 330, 340.

Turning now to FIG. 4, illustrated is a schematic of one embodiment of the control circuit 200 of FIG. 2 that is capable of handling the examples given in FIGS. 3A–C. FIG. 4 illustrates a number of components that will first be listed and then described. Registers 400, 405, 410, 415, 420 receive data pertaining to a buffer operation. The register 400 receives and stores cb_end (the upper boundary of the circular buffer 210 of FIG. 2). The register 405 receives and stores cb_beg (the lower boundary of the circular buffer 210). The register 410 receives and stores index (nY)/offset, which is the offset component of an input address. The register 415 receives and stores base(aY), which is the base component of the input address and is contained in the address register. Finally, the register 420 receives and stores size, which is the number of words involved in the buffer operation.

A 3:2 compressor 425 and an adder 430 form a first datapath. A 4:2 compressor 435 and an adder 440 form a second datapath. A 3:2 compressor 445 and an adder 450 form a third datapath. An adder 455 forms a fourth datapath. A 3:2 compressor 460 and an adder 465 form a fifth datapath. An exclusive OR gate 470, an OR gate 475, an AND gate 480, an adder 485, an inverter 490 and various selectors 495 cooperate to complete the control circuit 200.

The operation of the control circuit 200 is best understood by referring to Table 2, below, which is a program, written in the well-known C computer language, that employs the same names and performs the same functions as the control circuit 200. Those skilled in the pertinent art will understand the structure and function set forth in the C program of Table 2, and that the control circuit 200 is a hardware version of the C program of Table 2. The function resultgen( ) corresponds to the address calculation logic 220 of FIG. 2 and the function requestgen( ) corresponds to the modification order determination circuitry 230 of FIG. 2.

TABLE 2

C Program for Circular Buffer Address Generation

```
#include <stdio.h>
#define PREMOD     0
#define POSTMOD    1
#define REQ_ADDR1  0
#define REQ_SIZE1  1
#define REQ_ADDR2  2
#define REQ_SIZE2  3
int resultgen(int cb_beg, int cb_end, int ay, int ny) ;
void requestgen (int cb_beg, int cb_end, int sz, int base,
                                int req[]) ;
//-----------------------------------------------------------
// This is the main routine which reads the test data file and
// calls the functions resultgen() and requestgen() in the
// right order based on the type of load/store
// (premod/postmod).
//-----------------------------------------------------------
int main(int argc, char* argv[])
{
    int beg,end,sz,ay,ny,mod ;
    int addr1,sz1,addr2,sz2,res ;
    int addr1e,sz1e,addr2e,sz2e,rese ;
    int pass,fail ;
    int chk ;
    int req[4] ;
    chk = 0 ;
    beg    = atoi(argv[1]) ;
    end    = atoi(argv[2]) ;
    sz     = atoi(argv[3]) ;
    ay     = atoi(argv[4]) ;
    ny     = atoi(argv[5]) ;
    mod    = atoi(argv[6]) ;
    if (argc 12) {
        chk     = 1;
        addr1e  = atoi(argv[7]) ;
        sz1e    = atoi(argv[8]) ;
```

TABLE 2-continued

C Program for Circular Buffer Address Generation

```
        addr2e  = atoi(argv[9]) ;
        sz2e    = atoi(argv[10]) ;
        rese    = atoi(argv[11]) ;
    }
    if (mod == PREMOD) {
        res = resultgen(beg,end,ay,ny) ;
        requestgen(beg,end,sz,res,req) ;
    } else if (mod == POSTMOD) {
        requestgen(beg,end,sz,ay,req) ;
        res = resultgen(beg,end,ay,ny) ;
    } else printf("***(err) Type must be pre or post [%d].\n",mod);
        exit (1) ;
}
addr1           = req[REQ_ADDR1] ;
SZ1             = req[REQ_SIZE1] ;
addr2           = req[REQ_ADDR2] ;
sz2             = req[REQ_SIZE2] ;
if (chk == 1) {
    if      ((addr1e != addr1) ||
             (sz1e != sz1) ||
             ((addr2e != addr2) && (sz2 != 0)) ||
             (sz2e != sz2) ||
             (rese != res)) {
        fail++ ;
        printf("ERROR:     ") ;
    } else {
        pass++ ;
        printf("           ") ;
    }
    printf("%d %d %d %d %2d %d   " ;
                beg,end,sz,ay,ny,mod) ;
    printf("[%d, %d] [%d, %d] [%d, %d] [%d, %d] [%d, %d] \n",
                addr1e,addr1,sz1e,sz1,addr2e,addr2,sz2e,sz2,rese,res) ;
} else {
    printf("%d %d %d %d %d %d %d %d %d %d %d\n",
                beg,end,sz,ay,ny,mod,addr1,sz1,addr2,sz2,res)
}
return(0) ;
}
//-----------------------------------------------------------
// This routine generates the address register result. If the
// load/store type is a pre-modify operation, the result is
// also used as the base address for the requestgen() funtion.
//-----------------------------------------------------------
int resultgen(int cb_beg,int cb_end,int ay,int ny)
{
    int res ;
    int enda, endb ;
    int asum ;
    int bufsum, bufdif ;
    int ny_neg ;
    int bf_neg ;
    // Get MSB of vector. ny_pos will be high if ny is >= 0.
    // Can be equal to zero, simplifies logic. ny_neg = (ny
    // 0x80000000) ;
    if (ny_neg) {
        enda = cb_end ;
        endb = cb_beg ;
    } else {
        enda = cb_beg ;
        endb = cb_end ;
    }
    asum   ay + ny
    // Remember (-X = -X + 1).
    bufsum = enda + -endb + ay + ny + 1 ;
    bufdif = endb + -ay + -ny + 1 ;
    bf_neg = (bufdif & 0x80000000) ; // get MSB of vector
    if ((!ny_neg & !bf_neg) || (ny_neg & bf_neg)) {
        res = asum ;
    } else {
        res = bufsum ;
    }
    return(res) ;
}
//-----------------------------------------------------------
// This routine generates the data for the actual load/store
// request. Since this logic is dependent on whether the
```

TABLE 2-continued

C Program for Circular Buffer Address Generation

```
// load/store address is pre-modified or post-modified, this
// becomes the critical path (especially for pre-modified since
// the base address must first be calculated before this logic
// using the resultgen() routine.
//
//
// base            - The base address of the operation. Will be aX
//                   for post-modified buffer operations and res, from
//                   resultgen(), for pre-modified buffer operations.
// wrem            - Number of valid words remaining between base
//                   and cb_end (room).
// vrem            - Number of valid words that would be remaining
/                    until the end of buffer is reached after request has
//                   been serviced.
// wrap            - Active high when request wraps around circular
//                   buffer. It is actually the sign bit of the
//                   difference between the number of valid words
//                   accessible until the end of the buffer is reached
//                   and the original request size.
// poss            - The variable wrem must be positive. If there are
//                   any bits set in the range –ge (23:21 is must be
//                   greater than sz, and there will be no wrap-around.
//                   If poss is 0, then wrem and sz are close and sz
//                   must be compared to wrem[1:0].
//
//-----------------------------------------------------------
void requestgen (int cb_beg,int cb end,int sz,int base,
                                int req[])
{
    int wrem ;
    int vrem ;
    int wrap, poss ;
    int reqs ;
    int wtst, wrev ;
    // Determine if the difference between the circular buffer
    // end and the base address is greater than the max data size
    // of a request (4 words). Since, by definition of the CB,
    // the difference will be greater than zero. For hardware
    // reasons, it is more convenient to reverse the subtraction,
    // so the result will always be negative.
    wrem = base + –cb_end + 1 ;    // will be some positive
    // number.
    // Determine if the number of valid words is less than
    // negative four (the max data request size). Since wrem is
    // negative, it will be less than –4 if all bits 23:2 are
    // set, a vectored AND. If the result is false (less than –4)
    // it is possible that a wraparound will occur. The variable
    // poss will be high if wrap is possible.
    poss = (~(wrem>>2)) ? 0 : 1 ;    // poss is vectored AND of
    // wrem[23:2]
    // Test for wrap around by determining the difference between
    // the number of words remaining, –wrem, and the request
    // size, sz. If (sz + wrem) is positive then (sz > –wrem) is
    // true and there is a wrap around. When there is a wrap
    // around, the result of (sz + wrem) will be the size of the
    // second request.
    wtst = (sz + wrem) & 0x0f ;     // test for wrap with four
    // bit adder. If bit four is set, wtst must be negative, sz
    // is less than wrem and there is no wrap around.
    wrap = (wtst & 0x00000008) ? 0 : 1 ;
    if (poss && wrap) {
        req[REQ_ADDR1] = base ;
        req[REQ_SIZE1] = –wrem ;
        req[REQ_ADDR2] = cb_beg ;
        req[REQ_SIZE2] = wtst ;
    } else {
        req[REQ_ADDR1] = base ;
        req[REQ_SIZE1] = sz ;
        req[REQ_ADDR2] = 0 ;
        req[REQ_SIZE2] = 0 ;
    }
}
```

Turning now to FIG. 5, illustrated is a flow diagram of a method, generally designated 500, of controlling a circular buffer carried out according to the principles of the present invention.

The method 500 begins in a start step 510, wherein it is desired to carry out a buffer operation with respect to a circular buffer. The method 500 proceeds to a step 520 in which address calculation logic having multiple datapaths is employed to calculate, from data regarding a buffer operation, an updated address result for the buffer operation. In an optional step 530, the address calculation logic also updates an address register in the DSP 100 of FIG. 1.

Next, in a decisional step 540, it is determined whether the buffer operation is pre-modified. If the buffer operation is pre-modified (YES branch of the decisional step 540), the updated address result is initially transmitted in a step 550 and a memory access request is subsequently transmitted in a step 560. If the buffer operation is post-modified (NO branch of the decisional step 540, the memory access request is initially transmitted in a step 570 and the updated address result is subsequently transmitted in a step 580. The method 500 then ends in an end step 590.

Although the present invention has been described in detail, those skilled in the art should understand that they can make various changes, substitutions and alterations herein without departing from the spirit and scope of the invention in its broadest form.

What is claimed is:

1. For use in a processor, a circular buffer control circuit, comprising:
    address calculation logic, having multiple datapaths, that calculates, from data regarding a buffer operation, an updated address result therefor; and
    modification order determination circuitry, coupled in parallel with said address calculation logic, that transmits a memory access request and said updated address result in an order that is based on whether said buffer operation is pre-modified or post-modified.

2. The circuit as recited in claim 1 wherein said address calculation logic calculates said updated address result in a single clock cycle.

3. The circuit as recited in claim 1 wherein said address calculation logic further updates an address register in said processor.

4. The circuit as recited in claim 1 wherein said address calculation logic employs an input address having base and offset components to calculate said updated address result.

5. The circuit as recited in claim 1 wherein said address calculation logic accommodates opposing directions of circular buffer operation.

6. The circuit as recited in claim 1 wherein said buffer operation involves varying numbers of words.

7. The circuit as recited in claim 1 wherein said processor is a digital signal processor.

8. For use in a processor, a method of controlling a circular buffer, comprising:
    employing address calculation logic having multiple datapaths to calculate, from data regarding a buffer operation, an updated address result therefor; and
    transmitting a memory access request and said updated address result in an order that is based on whether said buffer operation is pre-modified or post-modified.

9. The method as recited in claim 8 wherein said employing further comprises calculating said updated address result in a single clock cycle.

10. The method as recited in claim 8 wherein said employing further comprises updating an address register in said processor.

11. The method as recited in claim 8 wherein said employing further comprises employing an input address having base and offset components to calculate said updated address result.

12. The method as recited in claim 8 wherein said employing further comprises accommodating opposing directions of circular buffer operation.

13. The method as recited in claim 8 wherein said buffer operation involves varying numbers of words.

14. The method as recited in claim 8 wherein said processor is a digital signal processor.

15. A digital signal processor, comprising:
- a pipeline having stages and capable of executing an instruction calling for a buffer operation to be performed;
- a memory, coupled to said pipeline, that accommodates said buffer operation;
- address calculation logic, having multiple datapaths, that calculates, from data regarding said buffer operation, an updated address result therefor; and
- modification order determination circuitry, coupled in parallel with said address calculation logic, that transmits a memory access request and said updated address result to said memory in an order that is based on whether said buffer operation is pre-modified or post-modified.

16. The digital signal processor as recited in claim 15 wherein said address calculation logic further calculates said updated address result in a single clock cycle.

17. The digital signal processor as recited in claim 15 wherein said address calculation logic further updates an address register in said digital signal processor.

18. The digital signal processor as recited in claim 15 wherein said address calculation logic further employs an input address having base and offset components to calculate said updated address result.

19. The digital signal processor as recited in claim 15 wherein said address calculation logic accommodates opposing directions of circular buffer operation.

20. The digital signal processor as recited in claim 15 wherein said buffer operation further involves varying numbers of words.

* * * * *